(No Model.)  4 Sheets—Sheet 1.

T. WHITTAKER.
PRESS FOR MAKING BRICKS, TILES, &c.

No. 298,646.  Patented May 13, 1884.

Witnesses
James Johnson
John Richman

Inventor
Thomas Whittaker (No Model.) 4 Sheets—Sheet 2.

T. WHITTAKER.
PRESS FOR MAKING BRICKS, TILES, &c.

No. 298,646. Patented May 13, 1884.

Witnesses
James Johnson
John Richman

Inventor
Thomas Whittaker

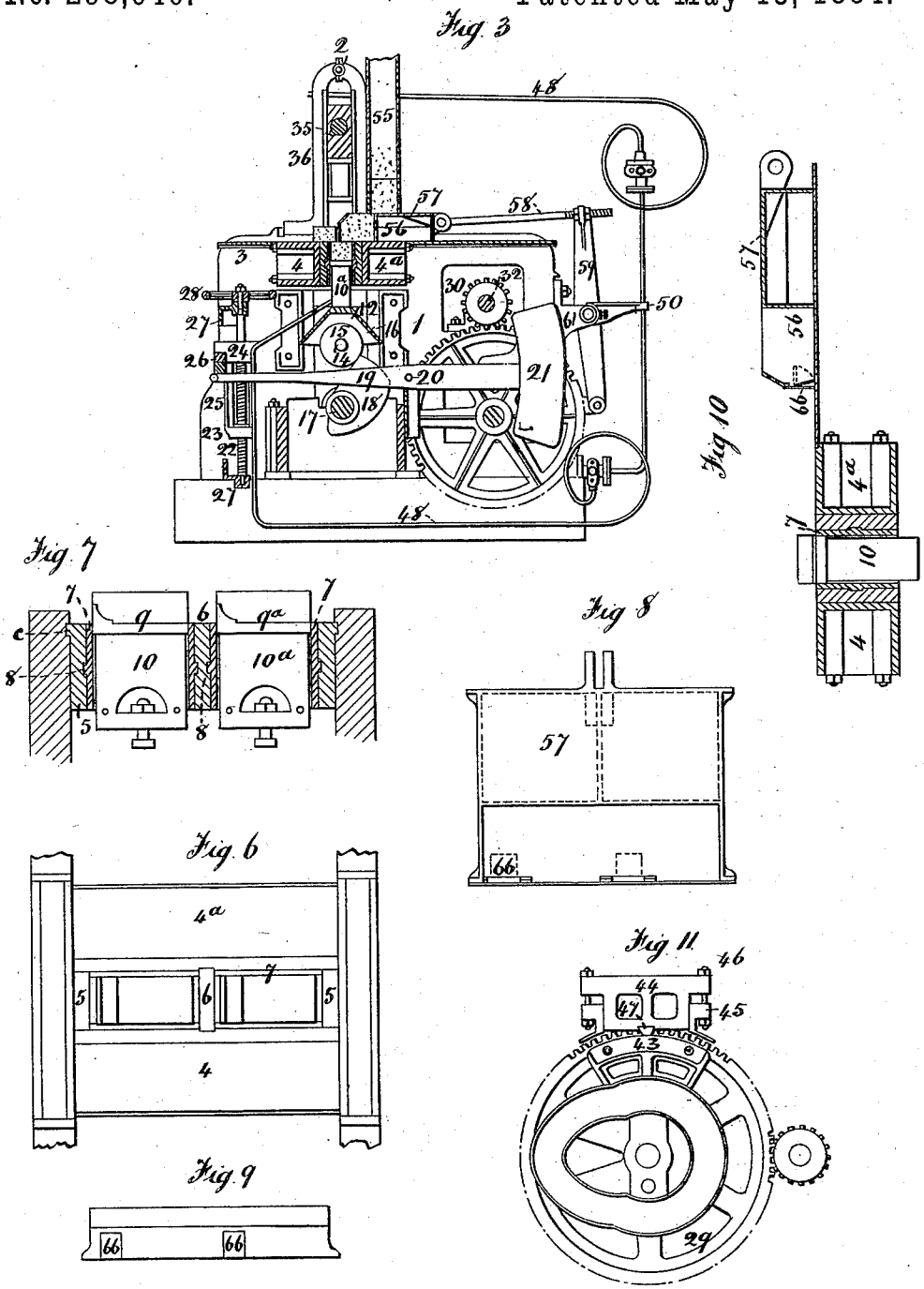

(No Model.)

4 Sheets—Sheet 4.

T. WHITTAKER.
PRESS FOR MAKING BRICKS, TILES, &c.

No. 298,646. Patented May 13, 1884.

Witnesses
James Johnson
John Richman

Inventor
Thomas Whittaker

UNITED STATES PATENT OFFICE.

THOMAS WHITTAKER, OF ACCRINGTON, COUNTY OF LANCASTER, ENGLAND.

PRESS FOR MAKING BRICKS, TILES, &c.

SPECIFICATION forming part of Letters Patent No. 298,646, dated May 13, 1884.

Application filed March 13, 1884. (No model.)

*To all whom it may concern:*

Be it known that I, THOMAS WHITTAKER, a subject of the Queen of Great Britain, residing at Accrington, in the county of Lancaster, England, have invented a new and useful Improvement in Presses for Making Bricks, Tiles, and like Articles, of which the following is a specification.

My invention relates to presses for forming pulverulent or powdery clay or other suitable materials—such as mixtures of cement and ashes—into bricks, tiles, and like articles. The object is to provide a machine which shall do its work efficiently, be capable of withstanding wear and tear to a large extent, be easily renewable in its working parts, and produce accurate and finished articles with rapidity and precision.

Figure 4:
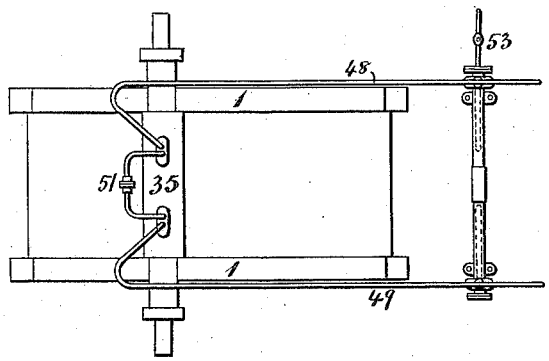
Figure 1:
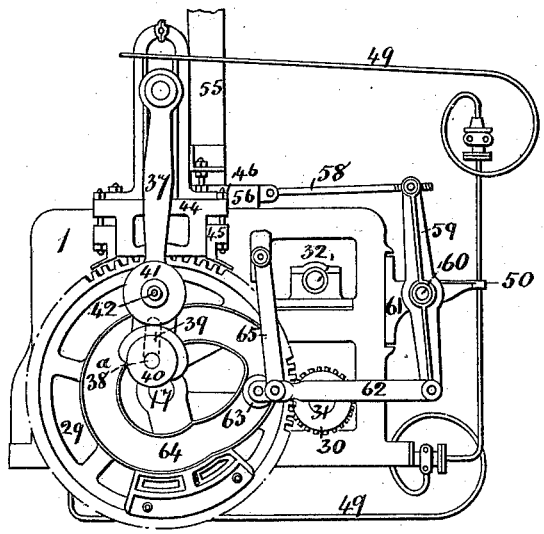
Figure 2:
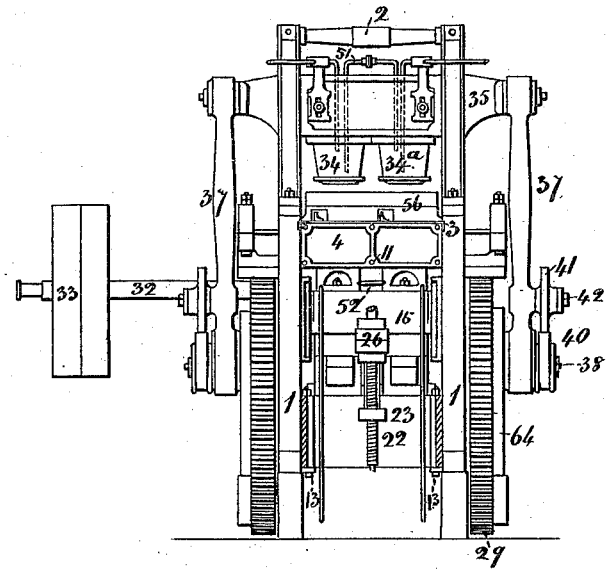
Figure 5:
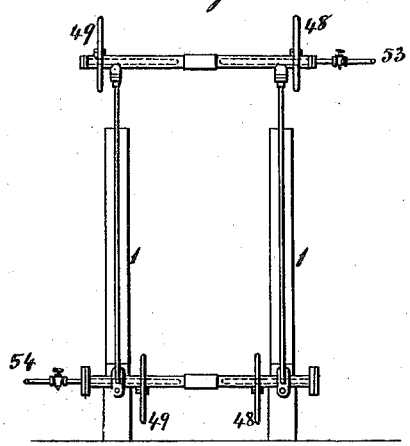
Figure 12:
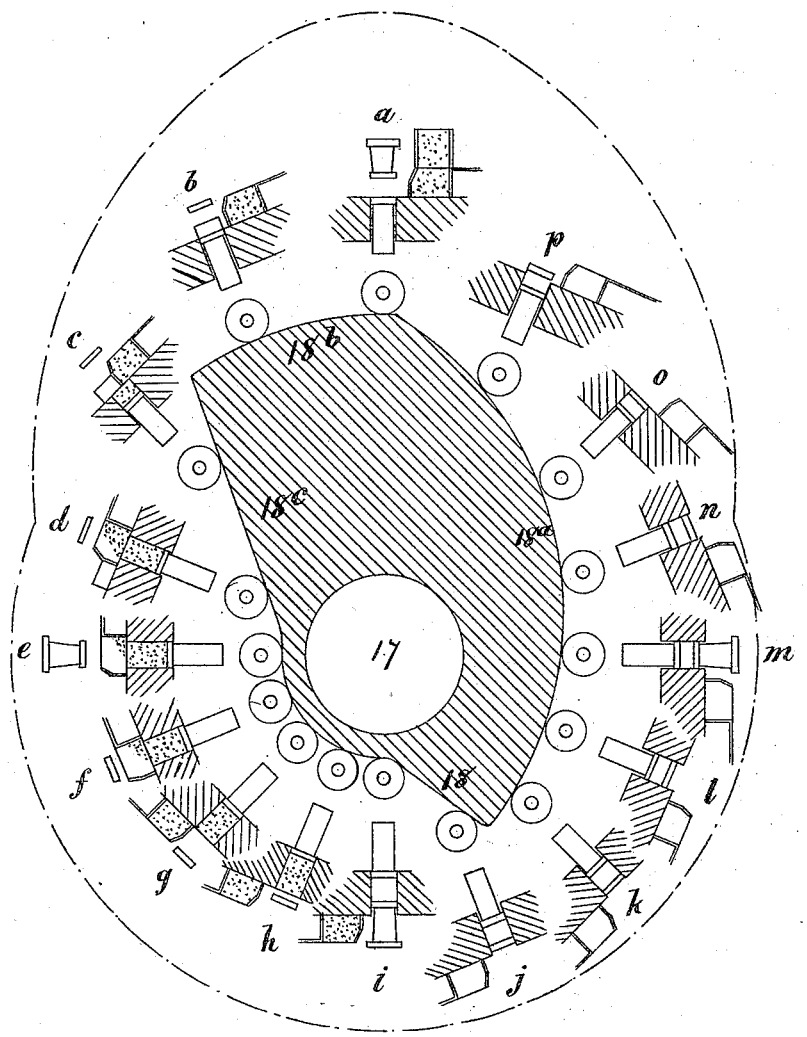

Figure 1 is a side elevation, Fig. 2 a front elevation, and Fig. 3 a vertical section, of the press. Fig. 4 is a plan, and Fig. 5 a back view, of the press, showing, mainly, the disposition of the steam-pipes. Fig. 6 is a plan, and Fig. 7 a transverse vertical section, of the molds. Fig. 8 is a plan, and Fig. 9 a front view, of the feed-box and table. Fig. 10 is a longitudinal section through the mold and feed-box. Fig. 11 is an elevation of a driving-wheel thrust-block and resistance-piece. Fig. 12 is a diagram showing the positions of the top and bottom pistons and the feed-box at various points of the revolution of the cam.

1 are the side frames of the press, securely bolted and held at the requisite distance apart by the struts and cross-bolts 2 and the mold-tables. Each frame 1 is formed or made with a groove, 3, into which the mold-tables 4 $4^a$ and end pieces, 5, fit; 6, central dividing-piece, held in grooves in the mold-tables 4 $4^a$; 7, liners fitting against the mold-tables 4 $4^a$, end pieces, 5, and dividing-pieces 6. The liners are of hard metal, to withstand wear and tear, and are held in position by grooves and projections 8.

9 $9^a$ are heads fitting freely within the molds, and secured to the lower compressing-pistons, 10 $10^a$. The heads are plain or shaped so as to give ornamental forms to the face of the bricks or like articles. The parts composing the molds are held together by through-bolts 11. When it is desired to vary the lengths and breadths of the bricks or like articles to be made, the bolts 11 are loosened and the tables 4 $4^a$ are slid apart, the end and dividing pieces and liners are removed, and suitable ones substituted. When it is desired to give the sides or ends of the bricks any particular shape, the liners are constructed accordingly, and the piston-face is made to match. The lower compressing-pistons, 10 $10^a$, are hollow, and are bolted to a bearer or drop-box, 12. The said bearer or drop-box works in guides 13 on the side frames, 1, and is provided with a shaft, 14, which carries anti-friction rollers 15.

16 are guard-plates cast with the drop-box 12, for the purpose of preventing clay or other material from falling from the molds or table on the moving parts beneath; 17, main driving-shaft, turning in bearings secured to the frames 1, and fitted with two cams, 18, one to act on each of the anti-friction rollers 15. The cams 18 are constructed with four distinct lifts, (see Fig. 12,) namely: 18, which gives the first upward motion or first pressure to the pistons; $18^a$, which gives a following and slower upward motion to the pistons until the bricks or finished articles are pushed out of the molds; $18^b$, which allow the pistons to remain at rest while the bricks or finished articles are pushed forward by the feed-box, and $18^c$, which lets the pistons fall until the drop-box 12 rests on the adjusting-lever 19. The adjusting-lever 19 passes between the cams 18, is pivoted at 20 on a shaft carried by the frames 1, and receives the drop-box between the fulcrum 20 and the adjusting-screw 22. The rear end of the lever carries a weight, 21, more than sufficiently heavy to balance the weight of the pistons, drop-box, and rollers on the front, and to keep the lever pressed against the wood buffer 26. The front end of the lever is forked, so as to pass at each side of the adjusting-screw 22.

23 is a nut on the screw 22, connected to the block 24 by arms 25; 26, buffers of wood or resilient material carried by the block 24, and against which the lever 20 rests; 27, bearings for the screw 22; 28, hand-wheel for giving motion to the screw 22. 29 are driving-wheels secured to the shaft 14, and receiving motion through the train of wheels and pinions 30 on shafts 31 32, rotating in bearings on the frames 1. The shaft 32 is provided with fast and loose pulleys 33. 34 $34^a$ are the top pressure-pistons carried by a cross-head, 35, moving in guides 36, secured to the frames 1. 37 are connecting-rods coupled to the cross-head 35 and to the crank-pins 38. The ends of the rods 37, coupled to the crank-pins 38, are formed with slots 39. 40 are cams fitted to the crank-pins 38; 41, rollers bearing on the cams 40, and carried by pins 42, secured to the connecting-rods 37. 43 are resistance-pieces formed with or firmly attached to the wheels 29; 44, thrust-blocks carried in slides 45 on the frames 1, and adjusted in position by bolts and nuts 46. 47 are wearing-pieces fitting in grooves in the blocks 44, and are capable of being renewed as they become worn; 48, steam-pipes connected to the upper piston 34 and lower piston 10; 49, exhaust-pipes connected to the upper piston, $34^a$, and lower piston, $10^a$; 50, brackets secured to the frames 1, and carrying the pipes 48 49; 51, pipe connecting the upper pistons; 52, pipe connecting the lower pistons; 53, inlet-valve; 54, exhaust-valve. 55 is a trunk leading from a hopper or floor, through which the pulverized or powdered material is fed to a feed-box, 56, free to be moved to and fro on the table $4^a$ beneath the said trunk. Part of the top of feed-box at 57 is made blank or closed. 58, connecting-rod; 59, levers oscillating in bearings 60 on the brackets 61, secured to the frames 1; 62, connecting-rods jointed to the lower ends of the levers, and provided with rollers 63, fitting within the grooved cams 64, secured to the wheels 29; 65, links pivoted to the frames 1 and to the rods 62, to retain the latter in position. When projecting heads 9 are used, the feed-box 56 is fitted in front with doors 66, made and situated so as to allow the feed-box to be pushed forward past the projecting head.

The method of operating the press is as follows: Steam is turned on and allowed to enter the pistons. Any water of condensation in the upper piston, 34, is forced by the pressure of the steam up the dipping end of the connecting-pipe 51 into the piston $34^a$, and thence up the dipping end of the exhaust-pipe 49 and away. Any water condensing in the lower pistons flows from the piston 10 through the pipe 52 into the piston $10^a$, and thence into the exhaust-pipe. The object of passing steam through the pistons and heating them is to prevent the adhesion of the pulverulent material to their surfaces, thereby obviating the use of oil or other lubricant. The molds are adjusted to the required width and length, and are fitted with suitably-shaped liners and piston-heads. The proper thickness of brick is provided for by varying the thickness of the face of the upper pistons or the distance of the faces from the cross-head. The quantity of pulverulent material that should enter the molds is adjusted by raising or lowering the front end of the lever 19 by means of the hand-wheel 28, so as to allow the lower pistons to fall more or less after the finished bricks or articles have been removed. The machine being started, the upper and lower pistons and feed-box are caused to move, as shown in Fig. 12. At $a$ the finished bricks are delivered level with the table, the top pistons having left the bricks; the feed-box at this point commences its stroke. At $b$ the lower pistons still remain level with the table; the upper pistons are ascending, and the feed-box advancing. At $c$ the lower pistons are descending; the feed-box has partly moved from under the trunk and pushed the brick onto the table, the upper pistons still ascending. At $d$ the lower pistons continue to descend and upper pistons to ascend, and feed-box to move over and fill the mold, the blank portion of feed-box passing under the trunk, so as to retain the pulverulent material therein. At $e$ the feed-box has reached the limit of its stroke, completely filled the mold, and pushed the finished brick or other article before it onto the table, the lower pistons being in their lowest position, the upper pistons in their highest position; the rollers 41 on the connecting-rods 37 rest on the concentric portion of the cams 40. At $f, g,$ and $h$ the lower pistons remain at rest while the upper pistons are descending and the feed-box retiring under the trunk to be refilled. At $i$ the lower pistons still remain at rest; the feed-box has retired under the trunk into its position of rest; the rollers 41 on the connecting-rods 37 have fallen down the straight portion on the cams 40, and the connecting-rods 37 have fallen to the bottom of the slot; the material in the molds is being pressed by the weight of the connecting-rods, cross-head, pistons, and other parts. At $j$ the lower pistons are raised with the weight above named, pressing the material and causing it to move up in the mold and carry with it the upper pistons; this motion of the material in the mold assists in causing the air to be pressed out before the final pressure is put on. At $k$ the crank-pin has reached the bottom of the slot; the upper and lower pistons are approaching each other, and the material is being pressed. At $l$ the above motions are continued. At $m$ the crank-pin has reached its lowest position, and the final pressure is being put on; the parts of the machine are therefore here subjected to the greatest stress; the resistance-pieces and thrust-blocks being in a line with the crank-pin, the stress is received and borne directly by the frame-work. At $n$ $o$ $p$ the upper and lower pistons travel up together till the lower pistons are level with table again. The cycle of operations is then repeated.

I am aware that in brick-machines hollow plungers have heretofore been heated by the introduction of steam, and also that a feed-box has been provided with an outwardly-swinging gate, so that the contents of the box would be discharged by the retraction of the feed-box, and do not herein claim the same.

I claim—

1. In a press for manufacturing brick, tile, &c., the combination of two adjustable side sections or mold-tables adapted to slide to and from each other, a separable septum, and detachable end pieces, whereby the size of the mold-cavity may be changed at will, substantially as and for the purposes specified.

2. In a press for the manufacture of brick, tile, &c., the combination, with a mold and a plunger adapted to project beyond the mold, of a feed-box having an inwardly-swinging door or gate which permits the feed-box to be pushed past the projecting plunger and over the mold-cavity, substantially as and for the purposes specified.

3. In a press for the manufacture of brick, tile, &c., the combination, with an adjustable mold, of a drop-box arranged below the mold and provided with guard-plates, and a hollow bottom plunger detachable from the drop-box, whereby the plunger may be changed to suit the size to which the mold is adjusted, substantially as and for the purposes specified.

4. In a press for manufacturing brick, tiles, &c., the combination of the twin molds and the hollow twin plungers, one of said plungers having a steam-inlet and the other an outlet-pipe, and the two pistons connected by a dip-pipe, substantially as and for the purposes specified.

5. In a press for manufacturing brick, tiles, &c., the combination of an adjustable mold, a bottom plunger having a separable head, a stop mechanism for limiting the drop of the plunger, and a feed-box having an inwardly-swinging door or gate which permits the feed-box to pass over the projecting head of the plunger, substantially as and for the purposes specified.

THOMAS WHITTAKER.

Witnesses:
JAMES JOHNSON,
JOHN RICHMAN.